United States Patent
Stevenson et al.

(10) Patent No.: US 6,702,535 B1
(45) Date of Patent: Mar. 9, 2004

(54) RIVET WITH SLIDING CAP AND EXTENDABLE STIRRER FOR FRICTION STIR RIVETING

(75) Inventors: Robin Stevenson, Bloomfield, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/337,147

(22) Filed: Jan. 6, 2003

(51) Int. Cl.[7] .................... F16B 37/06; F16B 39/02
(52) U.S. Cl. .................. 411/82; 411/21; 411/171; 411/180; 411/930; 29/525.14
(58) Field of Search ............................. 411/21, 29, 30, 411/82, 82.3, 171, 180, 258, 930; 29/525.02, 525.14

(56) References Cited

U.S. PATENT DOCUMENTS

| | | | |
|---|---|---|---|
| 4,850,772 A | | 7/1989 | Jenkins |
| 5,082,405 A | * | 1/1992 | Witten ........................ 411/82 |
| 5,713,706 A | * | 2/1998 | Lozano ....................... 411/171 |
| 5,975,772 A | | 11/1999 | Imai et al. |
| 6,053,391 A | | 4/2000 | Heidemann et al. |
| 6,454,891 B1 | * | 9/2002 | Goss ......................... 411/171 |
| 6,540,462 B1 | * | 4/2003 | Bretschneider et al. ....... 411/82 |

* cited by examiner

Primary Examiner—Neill Wilson
(74) Attorney, Agent, or Firm—Kathryn A. Marra

(57) ABSTRACT

A friction stir rivet is rotated and driven through a first fusible workpiece into an engaged second fusible workpiece, causing local portions of the first and second workpieces to plasticize. A slideable cap contacts the exposed surface of the first workpiece shortly after the process begins. The cap acts as a retaining element limiting plasticized material from escaping during the process. As the rivet is further driven into the members the cap slides up the rivet and actuates an angled stirring member to increase the stir radius around the body of the rivet. Once the rivet is driven into the first and second workpieces, rotation is stopped and the plasticized material cools and hardens around the rivet, creating a weld joining the workpieces and encompassing the rivet, which provides additional mechanical strength.

19 Claims, 3 Drawing Sheets

RIVET WITH SLIDING CAP AND EXTENDABLE STIRRER FOR FRICTION STIR RIVETING

TECHNICAL FIELD

This invention relates to friction stir welding and riveting, more particularly, to methods of joining multiple workpieces using a stir rivet to create a mechanical weld, an interweld, and a diffusion bond.

BACKGROUND OF THE INVENTION

Friction stir welding (FSW) is a method used to join metal workpieces. The method generally uses a cylindrical, shouldered tool with a profiled pin that is rotated at the joint line between two workpieces while being traversed along the joint line. The rotary motion of the tool generates frictional heat which serves to soften and plasticize the workpieces. This softened material, contributed by both workpieces, intermingles and is consolidated by the pin shoulder. As the pin moves laterally the frictional heating is reduced and the softened material hardens, creating a bond between the two workpieces. The best current understanding of the process is that no melting occurs and the weld is left in a fine-grained, hot worked condition with no entrapped oxides or gas porosity.

A common design of FSW stir rods is that the stirring element is substantially symmetrical with some irregularity to induce a stirring motion. Frequently the stir rod has a threaded appearance similar to a bolt. However, to promote intermingling and to retain the plasticized material in the weld zone for as long as possible the direction of rotation of the rod is such that the threads carry the plasticized material downward to create as turbulent a flow and as efficient an intermingling as possible. Particularly for metal workpieces the high thermal conductivity strongly localizes the region which is plastic enough to be deformed by the stirring action. Thus, the width of the stirred region is substantially equal to the width of the stirring rod.

SUMMARY OF THE INVENTION

This invention is based on a newly developed method which we call friction stir riveting. This method improves friction stir welding by using a stir rivet having a slideable cap and an angled stir member. The stir rivet is rotated and advanced into a pair of workpieces to plasticize material around the rivet for stir welding the workpieces together. Near the beginning of the process, the slideable cap contacts the first workpiece. The contact between the cap and the first workpiece creates a partial seal limiting the amount of plasticized material displaced from the stir site. As the rivet further progresses into the workpieces, a pivot member extends away from the body of the rivet to increase the stir radius around the rivet. The rivet is then left in place to form a weld between the rivet and the solidified material.

The present invention utilizes a friction stir rivet having an elongated body including a cylindrical section and enlarged upper and lower stops at opposite ends of the cylindrical section. The cylindrical section of the body extends through a slideable cap, which rests above the lower stop. A slot extends longitudinally along the cylindrical section and houses a portion of an angled pivot stir member. An interlocking guide extends longitudinally along a portion of the cylindrical section. Preferably, the interlocking guide on the cylindrical section is a flat surface.

The cap has a central opening surrounding the cylindrical section. The central opening of the cap has an interlocking guide mateable with the interlocking guide of the cylindrical section, which causes the cap to rotate with the body. Preferably, the interlocking guide in the central opening of the cap is a flat surface.

The upper stop forms the head of the rivet and provides an upper boundary, limiting upward travel of the cap. The lower stop serves as a lower boundary limiting downward travel of the cap. The underside of the lower stop forms the lower end of the rivet, which is the first portion of the rivet to frictionally contact the workpieces to be joined.

A recessed socket is centrally located on the upper portion of the upper stop and is aligned with the rotational axis of the rivet. To rotate the rivet, a rotational apparatus is inserted into the recessed socket.

The rivet, when rotated, locally softens and penetrates the bodies of the workpieces, creating a cavity filled with plasticized material. Shortly after the lower end of the rivet penetrates the first workpiece, the slideable cap contacts the first workpiece to create a seal around the stir site, thereby limiting the amount of displaced plasticized material seeping out of the cavity.

As the rivet advances into the workpieces, the cap slides up the elongated section of the rivet, engaging the actuating portion of the stir member and causing the actuating portion to pivot into the slot. As the actuating portion of the stir member pivots into the slot, the stirring portion of the member pivots outward into the workpieces, increasing the stir radius around the rivet. Upon reaching a desired depth the rotating motion is stopped and the joint is cooled to provide an internally welded joint maintained together partially by the mechanical shape of the rivet and partially by the welding of the components together.

The elongated section of the rivet has a smaller radial thickness than the lower stop, to create a re-entrant portion around the cylindrical section. When the rivet is embedded in the workpieces, the re-entrant portion between the cap and the lower end fills with plasticized material, increasing the volume of retention around the rivet. Allowing plasticized material to fill the re-entrant portion around the rivet increases the strength of mechanical retention.

During the process, the slideable cap restricts oxygen access around the rivet by creating a seal between the rivet and the first workpiece. The reduced oxygen supply around the rivet reduces the formation of oxidation on the cylindrical section of the rivet which provides a clean surface to form a bond with the plasticized material. Allowing formation of an oxide layer would interfere with bonding between the cylindrical section and the plasticized material.

The rivet should be formed of a relatively high melting point metal or refractory metal so that the rivet has a higher melting point than the workpieces to be joined. Preferably, the rivet should have a melting point that is at least 100° Fahrenheit higher and more preferably at least 200° Fahrenheit higher than workpieces, such as aluminum. Further, the rivet should be formed of a metal of substantially greater hardness than the metal workpieces to be joined. Exemplary metals include high carbon steel, titanium (e.g. titanium 6–4) and the like. Preferably, the rivet should be formed of a metal that is capable of forming a diffusion bond with the metal workpieces to be joined.

A rotational apparatus is used to rotate and press the rivet into the metal workpieces to be joined. The rivet penetrates best when it is rotated at speeds between 4,500 and 27,000 revolutions per minute. The amount of pressure needed to allow the rivet to penetrate the metal workpiece depends upon the speed of rotation. The rate of penetration is increased when the amount of pressure applied is increased, or when the revolutions per minute are increased. Under good conditions, a friction stir rivet can penetrate aluminum at up to 27 millimeters per minute.

The foregoing description is directed, as an example, to joining aluminum metal workpieces with a stir rivet made of metal with a higher temperature melting point. However, it should be understood that other fusible materials may be joined using the same process with a proper selection of compatible materials. Thus, other metals and thermoplastics may also be successfully joined with a stirring rivet and process within the guidelines above described.

These and other features and advantages of the invention will be more fully understood from the following description of certain specific embodiments of the invention taken together with the accompanying drawings.

DESCRIPTION OF THE PREFERRED EMBODIMENT

Figure 1:
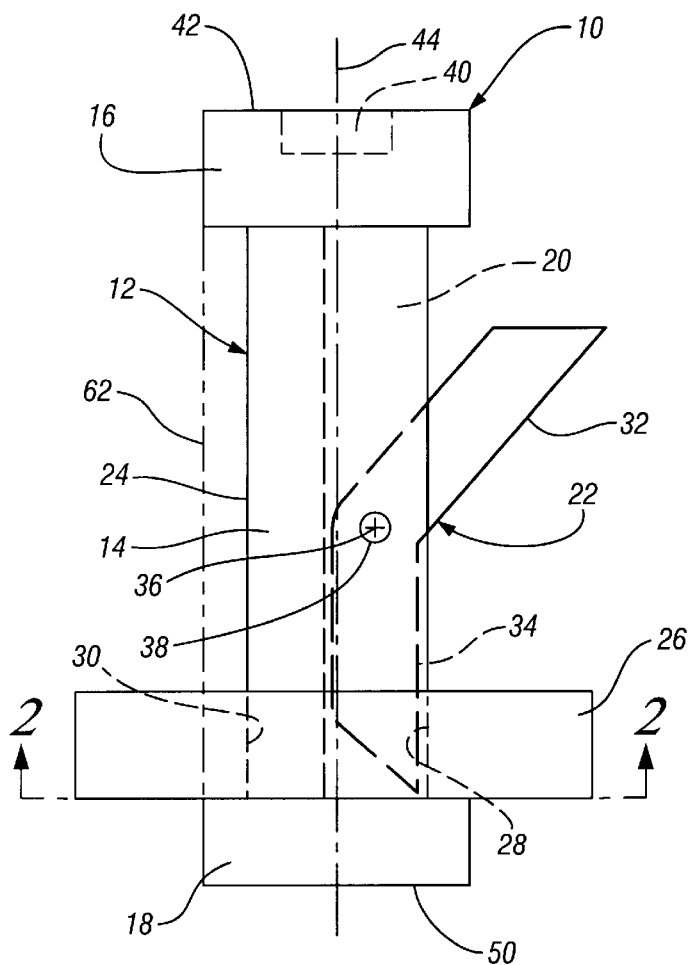
FIG. 1 is a side view of an exemplary embodiment of friction stir rivet according to the invention.
Figure 2:
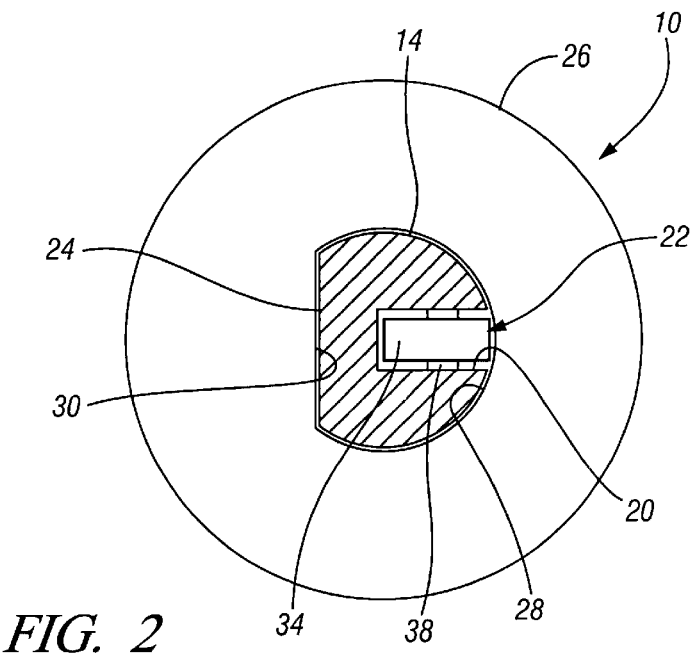
FIG. 2 is a cross-sectional view from the line 2—2 of FIG. 1.

Referring first to FIGS. 1 and 2 of the drawings in detail, numeral 10 generally indicates a friction stir rivet according to the invention. Rivet 10 includes an elongated body 12 having a cylindrical section 14 with enlarged upper and lower stops 16, 18 at opposite ends of the cylindrical section 14. A slot 20 extends longitudinally along the cylindrical section 14 and houses a portion of an angled pivot stirring member 22. An interlocking guide 24 extends longitudinally along the cylindrical section 14. Preferably, the interlocking guide 24 of cylindrical section 14 is a flat surface.

A cap 26 is slideably mounted on the cylindrical section of the body 12. The cap 26 has a central opening 28 surrounding the cylindrical section 14. The central opening 28 has an interlocking guide 30 mateable with the interlocking guide 24 of the cylindrical section 14, which causes the cap 26 to rotate with the cylindrical section 14. Preferably, the interlocking guide 30 of the cap 26 is a flat surface.

The stirring member 22 includes an actuating portion 32 and a stirring portion 34 extending from a pivot point 36 at an angle less then 180°. The stirring member 22 pivots on a pin 38 extending laterally across the slot 20. As the cap 26 slides up the cylindrical section 14, it engages the actuating portion 32 of the stirring member 22, pivoting the actuating portion 32 into the slot 20. This causes the stirring portion 34 to extend outward from the body 12. As the stirring portion 34 extends outward from the body the stirring radius around the rivet is increases. When the cap 26 contacts the upper stop 16, the actuation portion 32 is completely recessed in the slot 20 while the stirring portion 34 is fully extended.

The upper stop 16 forms a head of the rivet 10 and provides an upward stop for cap 26. A recessed socket 40 is centrally located on upper portion 42 of the upper stop 16 and is aligned with rotational axis 44 of the rivet 10. To rotate the rivet 10, a rotational apparatus is inserted into the recessed socket 40 of the rivet 10.

Figure 3:
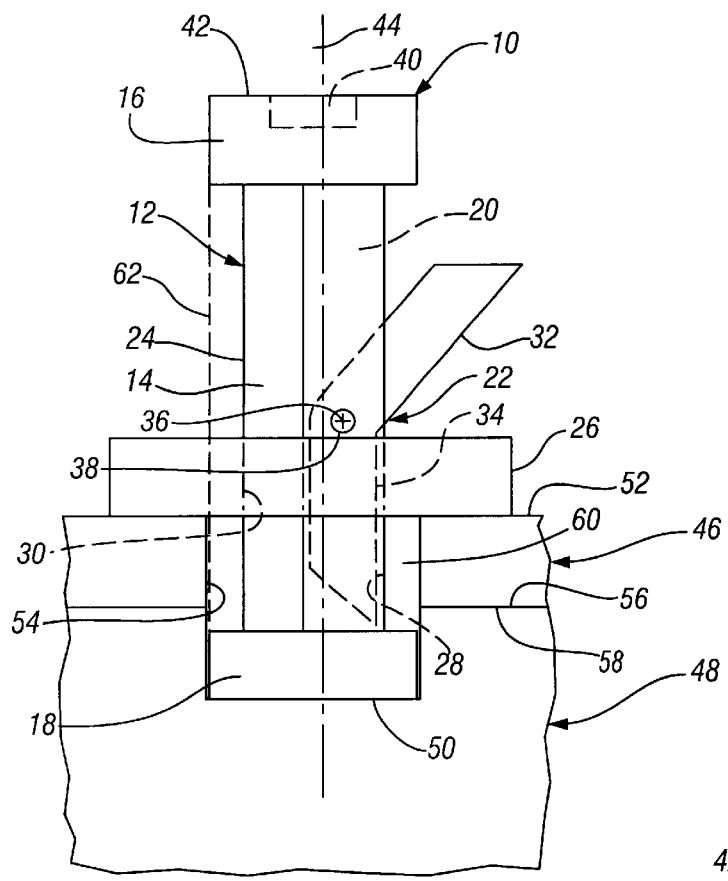
FIG. 3 is a cross-sectional view showing an initial stage in a method of friction stir riveting two workpieces together with the rivet of FIGS. 1 and 2.
Figure 4:
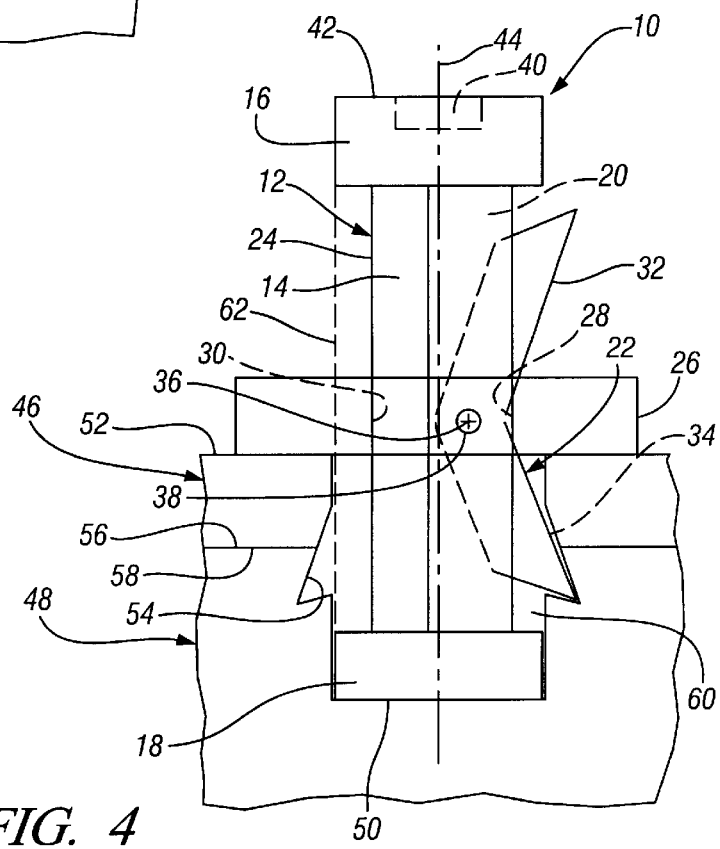
FIG. 4 is a cross-sectional view showing an intermediate stage of the method of FIG. 3.
Figure 5:
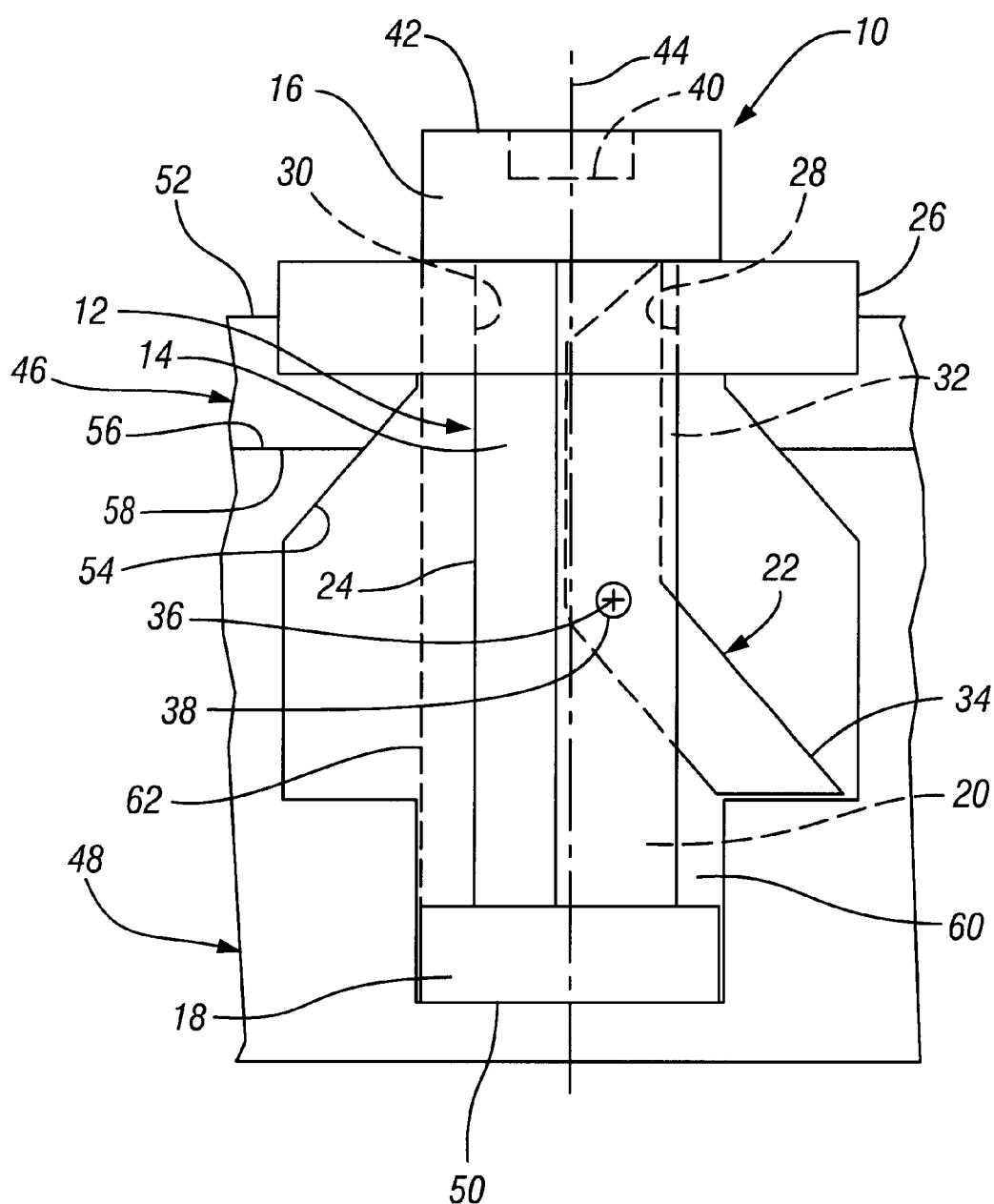
FIG. 5 is a cross-sectional view showing a final stage of the method of FIGS. 3 and 4.

FIGS. 3–5 show the rivet 10 in use in a method of friction stir riveting a first workpiece 46, such as a fusible aluminum sheet or plate, to a second workpiece 48, such as a fusible aluminum frame or other substrate. In operation, the rivet 10 is rotated around its rotational axis 44.

During rotation, downward force is applied to the rivet 10, causing a lower surface 50 of the lower stop 18 to frictionally contact an exposed surface 52 of the first workpiece 46. The downward force and rotation of the rivet 10 cause a portion of the first workpiece 46 to plasticize, allowing the rivet 10 to penetrate the workpiece 46 and create a cavity 54. As the rivet 10 is driven through an unexposed surface 56 of the first workpiece 46, the rivet frictionally contacts an unexposed surface 58 of the second workpiece 48. The downward force and rotation of rivet 10 cause a portion of the second workpiece 48 to plasticize, allowing the rivet to continue penetrating cavity 54. As the rivet 10 is driven through the first workpiece 46 into the second workpiece 48, the plasticized material 60 in cavity 54 is intermixed.

Shortly after the lower surface 50 of the rivet 10 penetrates the first workpiece 46, the slideable cap 26 contacts the first workpiece 46 to create a partial seal around the stir site, thereby limiting the amount of plasticized material displaced from the cavity 54. As the rivet 10 advances into the workpieces 46, 48, the cap 26 slides up the cylindrical section 14, engaging the actuating portion 32 of the stirring member 22. This pivots the actuating portion 32 into the slot 20, and extends the stirring portion 34 out of the slot into the cavity 54. The metal in the cavity 54 resists the outward motion of the stirring portion 34, which in turn resists the upward movement of the cap 26. The resistance against the cap 26 creates a reaction force between the cap 26 and the first workpiece 46, thereby maintaining the seal between the cap 26 and the first workpiece 46 as the cap 26 travels up the cylindrical section 14 of the body 12. This allows the cap 26 to act as a retaining element, limiting the amount of plasticized material 60 from escaping throughout the process.

Upon reaching a desired depth rotational motion is stopped and the joint is cooled to provide an internally welded joint maintained together partially by the mechanical shape of the rivet 10 and partially by the welding of the workpieces 46, 48 together.

Preferably, rivet 10 is driven though the first workpiece 46 and partially into the second workpiece 48 until the cap 26 of the rivet 10 is partially recessed into the exposed surface 52 of the first workpiece 46. However, the cap 26 may be left on the top of the first workpiece or recessed to any desired depth. Thereafter, the rotary motion of rivet 10 is stopped, allowing locally plasticized material 60 to harden and form several welds. Rivet 10 forms a mechanical bond between the first workpiece 46 and the second workpiece 48. Plasticized material 60 preferably forms a diffusion bond between the rivet 10 and the first and the second workpieces 46, 48. Further, the plasticized material 60 forms an inter-weld between the first workpiece 46 and the second workpiece 48.

The cylindrical section 14 of the rivet has a smaller radial thickness than the lower stop 18, to create a re-entrant portion 62 around the cylindrical section 14. When the rivet 10 is embedded in the workpieces 46, 48, the re-entrant portion 62 between the cap 26 and the lower stop 18 fills with plasticized material 60, increasing the volume of retention around the rivet 10. Allowing plasticized material 60 to fill the re-entrant portion 62 around the rivet 10 increases the strength of mechanical retention.

During the stirring process, the cap 26 restricts oxygen access around the rivet 10 by creating a seal between the cap 26 and the first workpiece 46. The reduced oxygen supply around the rivet 10 reduces the formation of oxidation on the cylindrical section 14, which provides a clean surface to form a bond with the plasticized material 60. Allowing formation of an oxide layer would interfere with bonding between the cylindrical section 14 and the plasticized material 60.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A friction stir rivet comprising:
   an elongated body including a cylindrical section and enlarged upper and lower stops at opposite ends of the cylindrical section;
   a slot extending longitudinally along the cylindrical section; and
   a stir member pivotally mounted in the slot and angularly displaceable to extend from the slot.

2. A rivet as in claim 1 wherein the stir member includes an actuating portion and a stirring portion extending from a pivot at an angle less then 180°.

3. A rivet as in claim 2 wherein the pivot is a pin extending laterally across the slot.

4. A rivet as in claim 1 including an actuator that engages the stir member at a predetermined point.

5. A rivet as in claim 4 wherein the actuator is a slideable cap.

6. A rivet as in claim 1 including a cap having a central opening surrounding the cylindrical section, the cap being slideable on the cylindrical section between the upper and lower stops.

7. A rivet as in claim 6 including interlocking guides, extending longitudinally on the cylindrical section and the cap and causing the cap to rotate with the body.

8. A rivet as in claim 7 wherein the interlocking guides include flats on the central section and in the cap opening.

9. A rivet as in claim 1 including a rotary drive receiver on an upper portion of the rivet.

10. A rivet as in claim 1 wherein the radial thickness of the cylindrical section is less than that of the lower stop, thus creating a re-entrant portion around the cylindrical section of the rivet.

11. A method of joining first and second fusible workpieces at a point of engagement, comprising the steps of;
   providing a rivet having an elongated body formed of a material with a substantially higher melting point than that of the fusible workpieces wherein the body includes a cylindrical section having a longitudinal slot partially housing a pivotable stir member;
   rotating the body about a rotational axis and simultaneously driving the body downward through a first workpiece and into a second workpiece, thereby forming a cavity and plasticizing material surrounding the body;
   actuating the stir member to increase the stir radius around the rivet while driving the body downward into the workpieces, thereby increasing the diameter of the cavity surrounding the body;
   stopping further rotation and inward driving of the rivet after a desired depth is reached; and
   cooling the fusible workpieces and the rivet, until solidification of the plasticized material occurs whereby the fusible workpieces are held together by the solidified material and by the rivet retained within the workpieces at the point of engagement.

12. A method as in claim 11 including forming the rivet of a material compatible with that of the fusible workpieces such that during cooling of the plasticized material surrounding the rivet a diffusion bond is created between the rivet and the surrounding material.

13. A method as in claim 11 wherein the cooling step causes interwelding of the fusible workpieces.

14. A method as in claim 11 wherein the cooling step embeds the rivet to form a mechanical bond between the joined workpieces.

15. A method as in claim 11 including engaging a slideable cap against the first workpiece while the body slides through the cap, thereby, maintaining a full volume of plasticized material in the cavity while allowing excess material to escape.

16. A method as in claim 15 wherein maintaining the cavity full of the material limits oxygen from entering the cavity thereby reducing the formation of oxidation around the body.

17. A method as in claim 15 wherein sliding of the body through the cap causes the slideable cap to engage the stir member and pivot the stir member outward to increase the stir radius of the rivet.

18. A method as in claim 17 wherein the stir member includes an actuating portion and a stirring portion extending from a pivot at an angle less then 180°, so that when the cap engages the actuating portion of the stir member, the actuating portion pivots into the longitudinal slot while the stirring portion is pivoted outward.

19. A method as in claim 11 wherein the fusible workpieces are metal.

* * * * *